US012560024B2

(12) United States Patent (10) Patent No.: US 12,560,024 B2
Koch et al. (45) Date of Patent: Feb. 24, 2026

(54) TWO PARTICLE ELECTROPHORETIC LAMINATE FOR USE WITH SMART WINDOWS WITH REDUCED DIFFRACTION

(71) Applicants: University of Cincinnati, Cincinnati, OH (US); Crown Electrokinetics Corp., Corvallis, OR (US)

(72) Inventors: Tim R. Koch, Albany, OR (US); Jason C. Heikenfeld, Cincinnati, OH (US); Sayantika Mukherjee, Forest Grove, OR (US)

(73) Assignees: University of Cincinnati, Cincinnati, OH (US); Crown Electrokinetics Corp., Corvallis, OR (US)

( * ) Notice: Subject to any disclaimer, the term of this patent is extended or adjusted under 35 U.S.C. 154(b) by 28 days.

(21) Appl. No.: 18/458,422

(22) Filed: Aug. 30, 2023

(65) Prior Publication Data

US 2023/0417102 A1 Dec. 28, 2023

Related U.S. Application Data

(60) Continuation of application No. 17/106,646, filed on Nov. 30, 2020, now Pat. No. 11,773,647, which is a (Continued)

(51) Int. Cl.
G02F 1/16762 (2019.01)
E06B 9/24 (2006.01)
(Continued)

(52) U.S. Cl.
CPC .............. E06B 9/24 (2013.01); G02B 26/007 (2013.01); G02B 26/026 (2013.01); G02F 1/167 (2013.01);
(Continued)

(58) Field of Classification Search
CPC ..... G02B 26/007; G02B 26/026; G02F 1/167; G02F 1/16756; G02F 1/1676;
(Continued)

(56) References Cited

U.S. PATENT DOCUMENTS

2007/0268245 A1 11/2007 Sugita et al.
2011/0141087 A1* 6/2011 Hiji ...................... G09G 3/3446
345/211

(Continued)

FOREIGN PATENT DOCUMENTS

EP 2533098 A1 12/2012
JP 2005024868 A 1/2005
(Continued)

OTHER PUBLICATIONS

Goulding, M. et al., "Dyed Polymeric Microparticles for Colour Rendering in Elecrophoretic Displays," SID Symposium Digest (2010) 564.

(Continued)

*Primary Examiner* — Brandi N Thomas
(74) *Attorney, Agent, or Firm* — Wood Herron & Evans LLP

(57) ABSTRACT

A laminate which can serve as either a smart window or a smart mirror is formed using first and second substrates coated with transparent first and second electrodes which are separated by foraminous layer and a third grid-like linear electrode insulated from the first and second electrodes. The foraminous layer includes spacers defining a cell space which is filled with a colloidal ink having first and second particles. The first particles have a positive charge and a first color and second particles having a negative charge and a second color different from the first color. By altering the voltages of the first, second and third electrodes, one can achieve different light transmission characteristics which, (Continued)

for example, can alter the color temperature of the light transmitted through the laminate or enhance reflective colors.

19 Claims, 8 Drawing Sheets

Related U.S. Application Data division of application No. 15/552,924, filed as application No. PCT/US2015/063390 on Dec. 2, 2015, now Pat. No. 10,852,615.

(60) Provisional application No. 62/095,308, filed on Dec. 22, 2014, provisional application No. 62/086,296, filed on Dec. 2, 2014.

(51) Int. Cl.

| | |
|---|---|
| *G02B 26/00* | (2006.01) |
| *G02B 26/02* | (2006.01) |
| *G02F 1/167* | (2019.01) |
| *G02F 1/16756* | (2019.01) |
| *G02F 1/1679* | (2019.01) |
| *G02F 1/1675* | (2019.01) |
| *G02F 1/1676* | (2019.01) |

(52) U.S. Cl.
CPC ...... *G02F 1/16756* (2019.01); *G02F 1/16762* (2019.01); *G02F 1/1679* (2019.01); *E06B 2009/2464* (2013.01); *G02F 1/1676* (2019.01); *G02F 2001/1678* (2013.01); *G02F 2202/28* (2013.01); *G02F 2203/03* (2013.01); *G02F 2203/055* (2013.01)

(58) Field of Classification Search
CPC .............. G02F 1/16762; G02F 1/1679; G02F 2001/1678; G02F 2202/28; G02F 2203/03; G02F 2203/055; G02F 1/153; G02F 1/155; G02F 1/161; G02F 2001/1536; G02F 2202/36; G02F 1/13334; G02F 1/133792; G02F 1/134363; G02F 1/136245; G02F 1/136286; G02F 1/13629; G02F 1/136295; G02F 1/1368; G02F 1/15; G02F 1/1525; G02F 1/157; G02F 1/163; G02F 2001/1635; G02F 2201/44
See application file for complete search history.

(56) References Cited

U.S. PATENT DOCUMENTS

| | | |
|---|---|---|
| 2011/0297888 A1 | 12/2011 | Farrand et al. |
| 2012/0092754 A1 | 4/2012 | Yu et al. |
| 2013/0075664 A1 | 3/2013 | Farrand et al. |
| 2013/0208343 A1 | 8/2013 | Yang et al. |
| 2013/0268071 A1 | 10/2013 | Vilupuru et al. |
| 2014/0160552 A1 | 6/2014 | Seong et al. |

FOREIGN PATENT DOCUMENTS

| | | | | |
|---|---|---|---|---|
| JP | 2008129393 | * | 6/2008 | ............. G02F 1/153 |
| KR | 20140076438 | * | 12/2012 | ........... G02B 26/026 |

OTHER PUBLICATIONS

Y. Naijoh et al. "Multilayered electrochromic display", ITE and SID, 2011.

R.A. Hayes and B.J. Feenstra, "Video-speed electronic paper based on electrowetting," Nature 425 (6956), 383-385 (2003).

Comiskey et al, "An electrophoretic ink for all printed reflective electronic displays", Nature (394), 253-255, 1998.

R. Baetens et al, "Properties, requirements and possibilities of smart windows for dynamic daylight and solar energy control in buildings: a state-of-the-art review", Solar energy Materials and Solar Cells, 94(2010), 87-105.

H. You et al, "Versatile electrowetting arrays for smart window applications from small to large pixels on fixed and flexible substrates", Solar Energy Materials and Solar Cells, 117 (2013).

J. Heikenfeld et al., "Review Paper: A critical review of the present and future prospects for electronic paper", J. Soc. Info. Display 19(2), 129-156(2011).

J. Heikenfeld, "A New Biprimary Color System for Doubling the Reflectance and Colorfulness of E-paper", SPIE Photonics, Feb. 2011.

S. Mukherjee et al., "A first demonstration and analysis of the biprimary color system for reflective displays", J. Soc. Info. Display 22, 106-114, (2014).

K. H Lenssen et al., "Novel concept for full color electronic paper", J. Soc. Inf. Display, 17(4), 383-388(2009).

J.-S. Yeo, Z.-L. Zhou, T. Emery, G. Combs, V. Korthuis, J. Mabeck, R. Hoffman, T. Koch, and D. Henze, "Novel Flexible Reflective Color Media Integrated with Transparent Oxide TFT Backplane," SID Symposium Digest 41, 1041 (2010).

J.-S. Yeo, Z.-L. Zhou, J. Mabeck, G. Combs, V. Korthuis, R. Hoffman, B. Benson, T. Koch, and D. Henze, "Novel Flexible Reflective Color Media with Electronic Inks," IMID conf. proc. (2010).

T. Koch, J.-S. Yeo, J. Mabeck, R. Hoffman, B. Benson, G. Combs, V. Korthuis, Z. Zhou, D. Henze, "Reflective Electronic Media with Print-Like Color" IDW (2010).

S. Yang et al, "Light out coupling for reflective displays: Simple geometrical model MATLAB simulation and experimental validation", J.of Display Tech., vol. 7(9), 2011.

Granqvist et al, "Electrochromism and smart window design", Solid state Ion 53(1992), 479-489.

S. Park et al, "Polymer dispersed liquid crystal film for variable transparency glazing", Thin Solid Films, 517 (2009), 3183-3186.

European Patent Office, International Search Report and Written Opinion of the International Searching Authority, PCT Application No. PCT/US2015/063365, mailed May 3, 2016 (22 pages).

European Patent Office, International Search Report and Written Opinion of the International Searching Authority, PCT Application No. PCT/US2015/063390, mailed May 3, 2016 (24 pages).

International Preliminary Report on Patentability issued by The International Bureau of WIPO in corresponding PCT Application No. PCT/US2015/063390 on Jun. 6, 2017 (19 pages).

International Preliminary Report on Patentability issued by The International Bureau of WIPO in corresponding PCT Application No. PCT/US2015/063365 on Jun. 6, 2017 (17 pages).

* cited by examiner

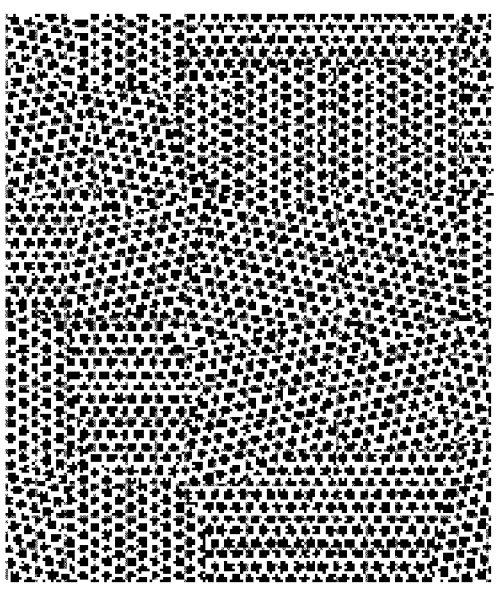
FIG. 1OA
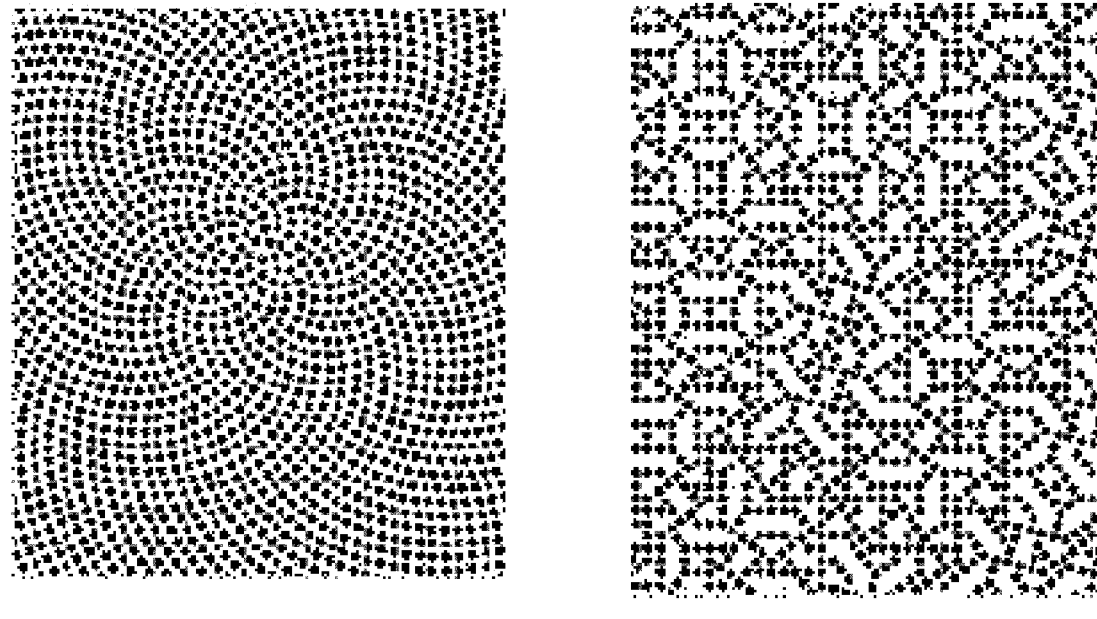
FIG. 1OB                    FIG. 1OC

TWO PARTICLE ELECTROPHORETIC LAMINATE FOR USE WITH SMART WINDOWS WITH REDUCED DIFFRACTION

RELATED APPLICATIONS

The present application is a continuation of U.S. application Ser. No. 17/106,646 filed Nov. 30, 2020 as a divisional application of U.S. application Ser. No. 15/552,924 filed Aug. 23, 2017 as a National Stage Entry of Intl. Application No. PCT/US15/63390 filed Dec. 2, 2015 claiming priority to U.S. Application Nos. 62/095,308 filed Dec. 22, 2014, and 62/086,296 filed Dec. 2, 2014. The disclosures of each of these applications are hereby incorporated herein by reference in their entireties.

STATEMENT REGARDING FEDERALLY SPONSORED RESEARCH OR DEVELOPMENT

The present invention was made with government support under Contract No. NSF 1231668. The U.S. Government has certain rights in the present invention.

BACKGROUND

Light valves used in displays or in smart windows are typically limited to electronic switching between two states, typically a clear and a black state. For full-color operation, color filters are utilized which typically reduce the optical transmission or reflection by three times. Furthermore, even the clear to opaque switching mechanism can be inefficient itself, further limiting the optical performance to the point of preventing commercial success for applications such as smart windows.

Smart windows are essentially laminates having light transmission or reflectance properties which can be modified. Although smart windows are most often created using laminate approaches, the layer which modifies light transmission or reflection properties can also be sandwiched between two plates of more rigid glass. The modification of the reflectance or transmission characteristics of the laminate can be caused by physical, electrical, or other stimulus. More specifically, smart glass is glass or a glazing whose light transmission properties are altered when voltage, light or heat is applied. There are various smart glass technologies, including electrochromic, photochromic, thermochromic, suspended particle, microblind and polymer dispersed liquid crystal devices.

When installed in the envelope of buildings, smart glass creates climate-adaptive building shells with the ability to save costs for heating, air conditioning and lighting, and avoid the cost of installing and maintaining motorized light screens or blinds or curtains. Most smart glass blocks ultraviolet light, reducing fabric fading. Smart glass has limited applications due to the high cost of manufacture and the limitations with respect to altering light transmission.

Typical methods of forming smart glass are extremely expensive. Further, most smart glass merely changes from transparent to translucent and is monochromal. Therefore, mechanical blinds or screens can basically achieve the same results as smart glass at a significantly-reduced price. For this reason, there is relatively little motivation to install smart glass in buildings.

SUMMARY

The present invention provides a laminate covered with electrokinetic pixels, or a layer comprising electrokinetic pixels, which utilize a first transparent layer coated with a transparent planar electrode and a second layer coated with a second electrode, wherein the two electrodes are separated by a clear foraminous insulating layer. The laminate further includes a third grid-like linear electrode separate from the first and second electrodes. The cell space between the first and second electrodes is filled with a colloidal dispersion having two types of particles: the first type of particle having a first color and/or other optical property and a positive charge and a second type of particle having a second color and/or other optical property different from the first and a negative charge. By altering the polarity of the first, second and third electrodes, one can achieve a variety of different light transmissive states. By selecting the appropriate particle dispersion, one can provide a smart window which provides color temperature control or one which controls privacy, going from opaque to clear, or one that controls energy, going from opaque to infrared-absorbing. Other combinations of transmissive or reflective spectral properties are possible, so long as the two types of particles differ in at least one optical property. Further, if one of the two layers of the laminate is reflective, the present invention provides a smart mirror which can be turned on and off, changed in color, or softened.

BRIEF DESCRIPTION OF THE DRAWINGS

FIG. 10A is an overhead view of an alternative hole pattern.

FIG. 10B is an overhead view of a second alternate hole pattern.

FIG. 10C is an overhead view of a third alternate hole pattern.

DETAILED DESCRIPTION

Figure 1:
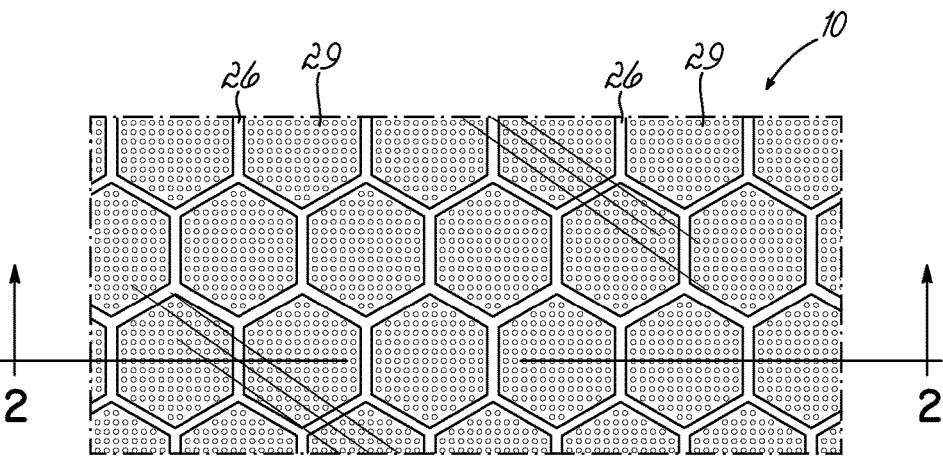
FIG. 1 is an overhead view of the present invention.
Figure 2:
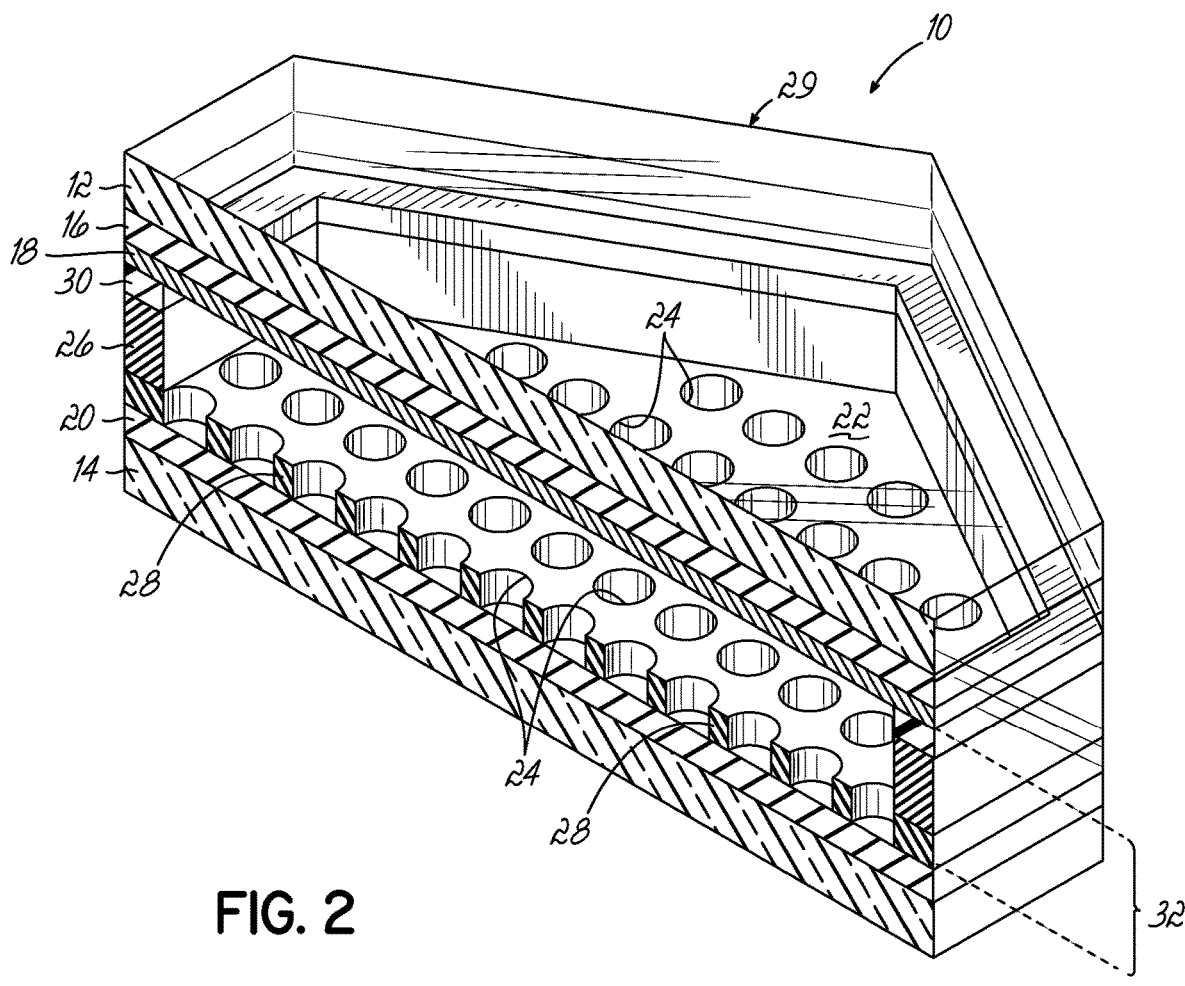
FIG. 2 shows an isolated cell broken away from the laminate shown in FIG. 1 according to the present invention.

As shown in FIGS. 1 and 2, the laminate 10 of the present invention includes a first transparent substrate layer 12 and a second substrate layer 14. Substrate layer 12 can be formed from glass or a clear polymer. Further, layer 12 or layer 14 can be rigid or flexible.

The first substrate layer 12 includes a clear, continuous, planar electrode 16 made from a transparent material such as indium tin oxide (ITO) and having a thickness of 10 nm to about 100 nm. The first electrode layer 16 is then coated with a continuous first insulating layer 18, generally having a thickness of about 0.1-10 microns. These dimensions set out herein are exemplary.

The second substrate layer 14 can be a clear layer, such as glass, clear plastic or plastic film, or it can be a reflective material if the laminate is to be used as a mirror. This invention is particularly beneficial when incorporated into smart glass. Accordingly, in most embodiments, the second substrate layer 14 will be light transmissive. The second substrate layer 14 includes a second planar, continuous electrode 20, again formed from a transparent electrically-conductive material such as ITO. A foraminous insulating layer 22 is adhered to electrode layer 20.

The foraminous insulating layer 22 includes a series of pits or holes 24 which extend to the electrode 20. Hexagonal, or other geometry, spacers 26 separate insulating layer 18 from the foraminous surface of layer 22. The holes 24 are separated from each other by material 28 which forms the foraminous layer 22. For convenience, we will simply refer to layer 22 as a foraminous layer, but that does not limit the present invention to just hole geometries for the pits or holes. For example, the pits or holes 24 could also be in a mesh or grid geometry, for example by having the foraminous layer 22 being a layer of pillars surrounded by a mesh or grid geometry of no insulating material which would provide the same effect of pits or holes 24.

Figure 4:
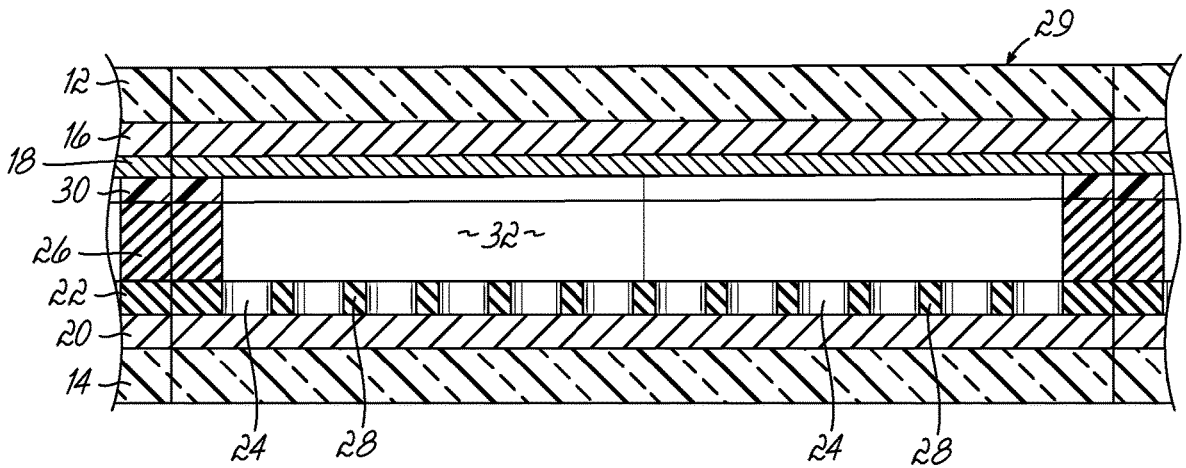
FIG. 4 is a cross-sectional view similar to FIG. 3 of an alternate embodiment of the present invention without the colloidal ink.

As shown in FIG. 4, the holes 22 will generally have an average diameter of 6 to about 10 microns. The holes can be smaller or larger, depending on how much colorant is used.

Figure 3:
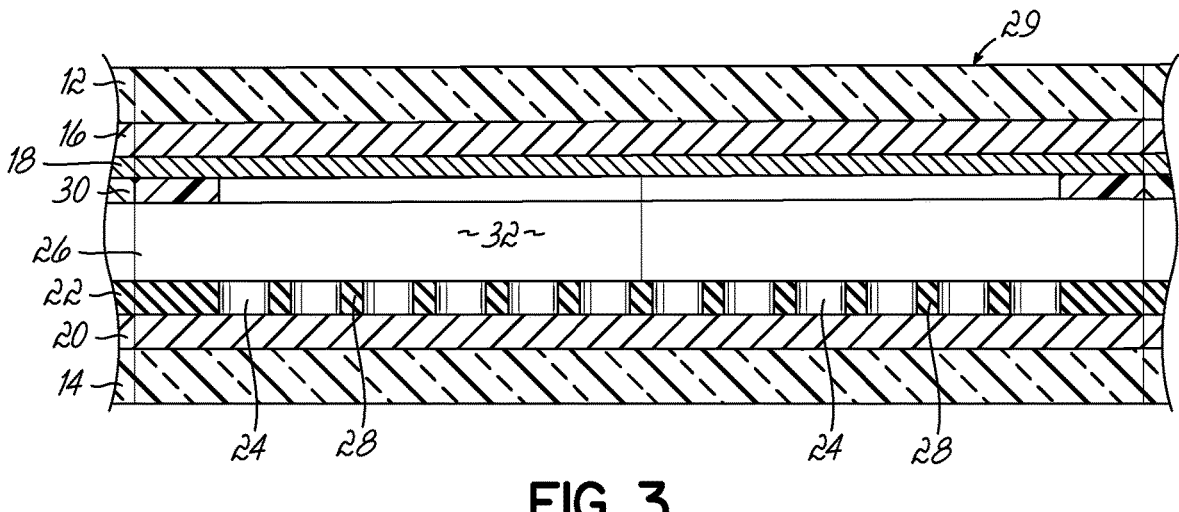
FIG. 3 is a cross-sectional view of an embodiment of the present invention without the colloidal ink.
Figure 5:
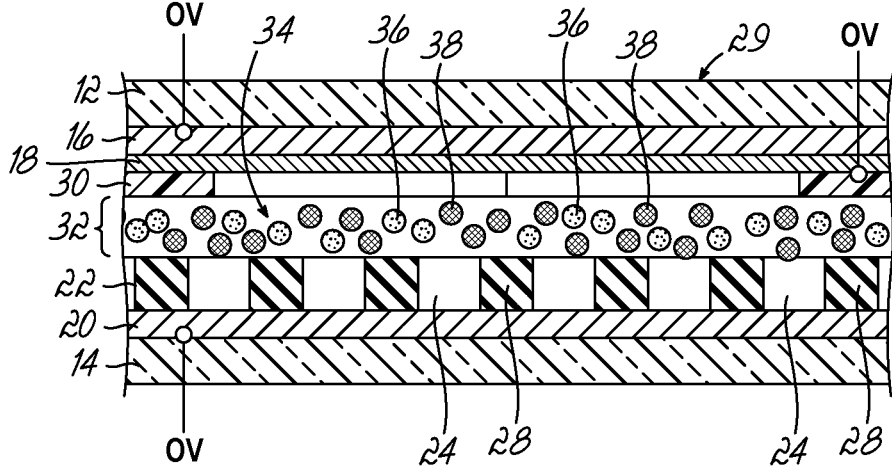
FIG. 5 is a cross-sectional view similar to FIG. 3 showing the K state.

Spacers 26 form a grid-like pattern. As shown, spacer 26 has an interconnected grid pattern. As shown in FIG. 1, this is a hexagonal pattern. But, as explained below, it can be a wide variety of different patterns. The spacer 26 defines a plurality of cells 29, again in the shape of hexagons as shown in FIG. 1. In the embodiment shown in FIGS. 2 and 4, the spacer 26 is coated with a third electrode grid layer 30 which is again an electrically-conductive material. This third electrode 30, a generally thin, linear electrode forms an interconnected grid pattern and will generally have a width of about 10-100 microns and a thickness of about 10 nm to about 10 µm or more, depending on the electrode material. The third electrode 30 is bonded to the first insulating layer 18, thereby defining the individual cells 29 which are closed. The spacer 26, in combination with the third electrode 30, separates the second electrode 20 from the first insulation layer 18, creating a cell gap 32. Inside the cell gap 32 is a colloidal dispersion 34 which includes first colored particles 36 which have a positive charge and second color particles 38 which have a negative charge, as illustrated in FIG. 5. As will be taught later, particles can also be transparent, or simply differ from each other in a least one optical property. (The particles are not shown in FIG. 2, 3 or 4.) The two different particles 36 and 38 have different colors, such as blue/yellow, red/cyan or the like.

The purpose of the insulating layer 18 is to prevent shorting between the third electrode 30 and the planar electrode 16. Therefore, in an alternate embodiment the insulating layer 18 could simply be printed or formed onto the third electrode 30 to achieve a similar result. Also, in an alternate embodiment, the planar electrode 16 simply need be transparent as described above, and could therefore be a fine metal mesh which could provide similar properties of being conductive and optically transparent.

The distance between adjacent holes 24 will generally be about 20 to about 50 microns, in particular, about 30 µm. The thickness of the foraminous layer 22 will generally be 6 to about 30 microns, in particular, 10 µm. The distance between the first insulating layer 18 and the second electrode 20 will generally be from about 6 to about 30, but can be greater. Certain embodiments can be formed with dimensions outside these ranges, depending on application and design variable, such as the type and amount of colorant.

The electrodes 16, 20 and 30 are each attached to a separate voltage source (not shown) which allows the polarity of each of the electrodes to be changed.

The colloidal dispersion ink located in cell gap 32 is formed from two particle types one having a positive charge and a first color or absorption characteristic and the second having a negative charge and a second color absorption characteristic. The different particles will generally have a particle size of about 100 to about 2000 nm and generally 100-800 nm and more particularly 150-700 nm. A dual particle colloidal dispersion ink is available from Merck Chemicals Limited and is further discussed in Dyed Polymeric Microparticles for Color Rendering in Electrophoretic Displays, SID Symposium Digest, 564 (2010) by M Goulding et al. Others are disclosed in U.S. Pat. No. 7,340,634 and U.S. published applications US2013/0075664 and US2011/0297888.

The colors of the first and second particles will provide different functionalities for the windows. Colors refer to absorption characteristics. Thus, infrared absorbing particles are considered a color, just not in the visible spectrum. Furthermore, colors can refer to another optical property such as optical scattering. For convenience, most of the specification will therefore just simply refer to particles with 'colors' but as discussed above, should not be so narrowly interpreted.

If it is desirable to alter the color temperature of the light transmission, in other words providing a cooler light or a warmer light, one would choose particles that are complementary in color, particularly blue/yellow or blue/amber or aqua/amber. Put another way, the first particles transmit primarily blue light and the second particles transmit at least most of red light. If one desires to achieve dimming and/or privacy of the window, particles which are optically transparent but scattering, and particles which are optically opaque, could be chosen, for example particles like those used in vertical reflective electrophoretic displays. If energy is a concern, particles which are optically absorbing in the infrared spectrum can form the first particles and particles which are optically absorbing in the visible spectrum the second particles. This allows one to change the energy savings of a window by blocking various levels of visible or infrared light transmitted through the window.

The particles are in a fluid carrier, generally a hydrophobic and electrically insulating fluid such as a hydrocarbon. Suitable carriers include commercially-available solvents such as Isopar or Norpar, naphtha, petroleum solvent and long chain alkanes such as dodcane, tetradecane, decane and nonane.

The refractive indices of the various layers, including substrates 12 and 14, the colloidal ink and the foraminous layer 22 can affect the window operation or optical transmission. If color temperature is important, the particles and all the layers in the device should have refractive indices that are fairly matched, typically close to 1.5.+−.0.2 if the carrier fluid were to have a refractive index of 1.5. The closer the refractive indices, generally the greater clarity of the window. If privacy is the main concern, opaque particles and light scattering particles are used. Refractive index is not as important for the opaque particles. However, the optically-scattering particle should have a refractive index that is substantially lower or greater than the fluid carrier, and is often greater than 1.7, preferably greater than 2. In particular, metal oxide particles are very good for light scattering. And finally, if energy is a concern, one particle is black in the visible spectrum and, therefore, the refractive index is not as important, while the optically-absorbing particle in the infrared spectrum should be clear and therefore should have a refractive index of 1.5.+−.0.2 or even closer to that of the carrier fluid.

The first and second substrate layers 12 and 14 can be the same or different materials. They can be flexible or rigid. Both can be transparent, or one can be transparent and one reflective if a mirror is formed. In particular, substrates can be glass or a clear plastic, such as polyolefins, polyesters or polyamides. Further, the substrates 12 and or 14 can include a hermetic layer. The thickness of the substrate layers will vary depending upon the desired application. If a window-pane is formed, the substrate layers may be glass and should have a thickness that provides the effective structural strength required. The laminate 10 can be rigid if either or both of the substrates 12 and 14 are rigid. If both substrates are flexible, the laminate can be a film which can then be adhered to glass to form a smart window or suspended in a frame under tension to form a smart window.

The insulating layer 18 can be a wide variety of different materials but should be generally transparent and non-conductive, such as clear screen printable insulating material typically used in the fabrication of printed circuit boards. Other clear plastics or materials can also be used. If the foraminous layer 22 is formed by photolithographic development, the foraminous layer is a UV-curable polymer which can be developed. One such material is SU-8. If the foraminous layer 22 is formed using a roll-coating process, in other words without photolithographic developing, other materials can be utilized, such as UV curable polymers or thermoplastics including polyesters, polyolefins, polyamides and the like.

The electrode material which forms the third electrode 30 may be clear or opaque. The third electrode 30 can be formed from, for example, a conductive adhesive such as a carbon paste or silver epoxy and thus the electrode can also act as a binding agent, holding the laminate 10 together. The electrode 30, in combination with the spacer 26, will then define a closed cell which prevents pigment particles from migrating from cell to cell. Alternately, electrode 30 can be aluminum or ITO and can be printed or photolithographically formed onto insulting layer 18 or bonded to insulating layer 18 by an adhesive. In the illustrations, electrode 30 is aligned with spacers 26, but such alignment is not so required for achieving control of the particles.

FIG. 1 shows cells 29 with a general hexagonal pattern with evenly-spaced rows and columns of holes 24 as shown in FIG. 2. Both this electrode pattern and the spacing of the holes can be modified to achieve different results. In particular, FIGS. 10A to 10C show a variety of different patterns of holes 24 through foraminous layer 22. These designs can, for example, reduce diffraction relative to a pattern of uniform rows and columns of holes. The pattern shown in FIG. 10A has nine different hexagonal patterns rotated at different angles. This mimics a moth's eye to reduce diffraction pattern. The pattern shown in FIG. 10B is a very high symmetry pattern based on a sunflower seed arrangement with multiple spiral rows of holes. The resulting diffraction pattern is circular with no strong underlying lower symmetry orders. FIG. 10C shows a Conway pinwheel hole pattern. All of these patterns provide increased suppression of backscatter diffraction or forward diffraction.

The third electrode 30 is an electrode grid which can be formed in a variety of different grid patterns in addition to hexagons. The grid pattern can, for example, be interconnected triangles, interconnected rectangles, random intersecting ovals and the like or even a series of straight linear parallel electrodes, which may be periodically connected to each other. The shape of the cell pattern can be varied to affect light transmission characteristics and/or to avoid effects such as optical diffraction. To minimize optical diffraction, the grid pattern could be in the form of a tessellated non-Euclidean pattern. Because electrode 30 is a grid, if there is a single break anywhere, it will have no impact because the grid pattern provides multiple electrically-conductive paths.

The laminate 10 can be formed using various different processes. In the embodiment shown in FIGS. 3, 5, 6, 7, 8 and 9, the substrates 12 and 14 are coated with the planar electrodes 16 and 20 and insulating layer 18 using standard coating techniques. The foraminous layer 22 can be applied as a continuous coating, with the holes 24 subsequently formed by photolithographic means. The grid electrode 30 is applied directly to insulating layer 18, using a coating process. The individual cells are then dosed with the colloidal ink. The two layers are adhered together by bonding spacers (not shown in these FIGS.), which extend up from foraminous layer 22 to insulating layer 18, establishing the cell pattern.

The embodiments shown in FIGS. 2 and 4 are formed without use of photolithographic etching. The first and second substrate layers 12 and 14 are coated with, for example, indium tin oxide to form the first and second electrodes. The first electrode is then coated with an insulating layer 18, again using standard coating techniques. The foraminous layer 22 is formed using roll to roll microreplication of the holes 24 and spacers 26.

Contact printing, roller printing or other simple transfer methods are used to coat the spacer 26 with the material which forms the third electrode 30. This electrode material can be a conductive adhesive such as a silver epoxy. Alternately, the third electrode can be formed from, for example, indium tin oxide or aluminum and then coated with an adhesive. Alternately, the third electrode can be formed from, for example, from aluminum and then coated with an adhesive with spacer balls or other spacer particles which eliminate the need for the insulating layer 18 because the adhesive could act as the insulation layer. The colloidal ink is dosed into the individual cells and sealed by binding the insulation layer 18 to the electrode 30, forming individual close cells with a defined cell gap. Alternately, the spacer 26 and electrode 30 could be unified in the form of a wire mesh that is coated with an electrical insulator, or any other equivalent material or element that could form an effective grid electrode 30 that is electrically insulated from electrode 16 and electrode 20.

The electrodes 16, 20, 30 are then attached to the three different voltage sources (not shown). A conductive adhesive can be used to separately connect the three electrodes to three separate voltage sources.

In use, the voltages of the three electrodes can be individually positive, negative or neutral. FIGS. 5 to 9 show the various operations of the present invention. In these examples, the negative particles were green, and the positive particles were magenta. By varying the various voltages, five different states labeled K (black), W (white), M (magenta), Alternate W (white) and G (green) were achieved.

K State: As shown in FIG. 5, the initial state with no voltages applied is opaque as the particles spread evenly over time in the absence of voltage. Actively switching to the black state will be described at the end of this section.

Figure 6:
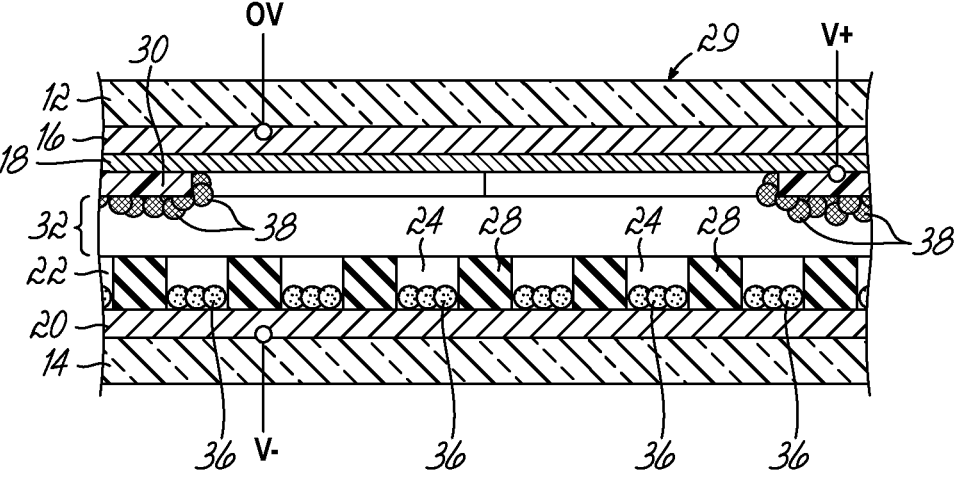
FIG. 6 is a cross-sectional view similar to the embodiment in FIG. 3 showing the W state.

W state: as shown in FIG. 6, starting from the previous K state, a W state is achieved by setting the bottom ITO electrode 20 to −25V and the hexagonal third electrode 30 to +25V, and the top first electrode 16 is kept at 0V. As a result, negatively charged green particles 38 are compacted at the hexagonal electrode 30 and the magenta particles 36 are compacted in the holes 24. After the switching is adequately complete (~10 s) this state can be maintained with voltages of less than 10V.

Figure 7:
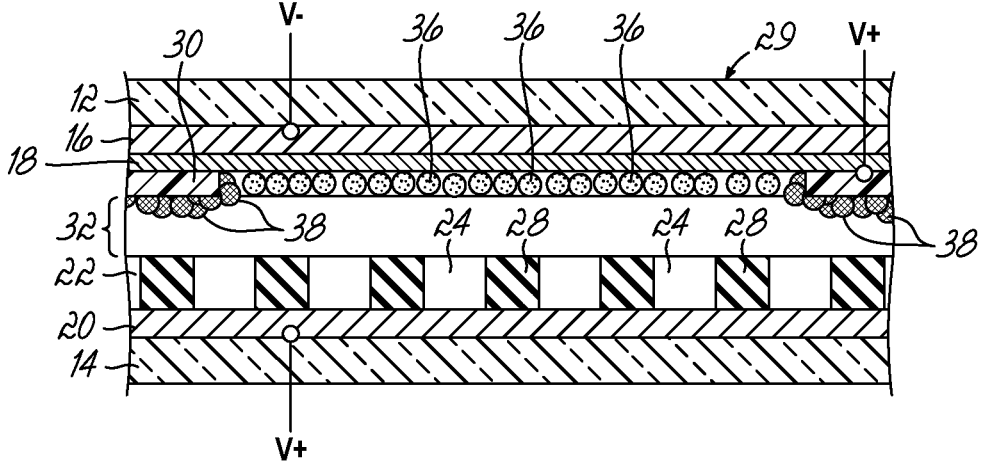
FIG. 7 is a cross-sectional view similar to the embodiment shown in FIG. 3 in the M state.

M state: M state is shown in FIG. 7. M state is achieved from the previous W state by switching the bottom ITO electrode 20 to +25V and the top ITO electrode 16 to −25V which then draws the magenta particles 36 to a spread state on the top plate 12, while the hexagonal electrode 30 is still maintained at the same +25V from previous state, retaining compaction of the green particles 38. The switching is complete as perceived by the naked eye at a distance, in (~10 s) and can be maintained at a low holding voltage of +/−10V.

Figure 8:
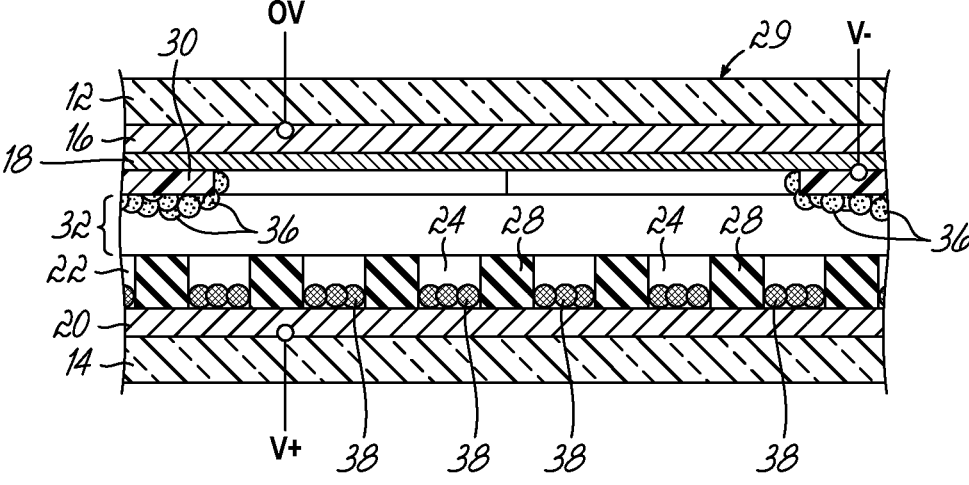
FIG. 8 is a cross-sectional view similar to the embodiment shown in FIG. 3 in the alternate W state.

Alternate W state: The alternate W state as shown in FIG. 8 is where the negatively charged green particles 38 are compacted in the holes 24 by setting the bottom electrode 20 to +25V and compacting the magenta particles 36 to the hexagonal electrode 30 by setting it to −25V while keeping the top ITO electrode 16 at 0V. For optimal optical performance (most complete particle movement), it is best to leave the M state, return to the original W, then actively to the K state (see section below), then finally switch to the alternate W state. Again, this state can be maintained at a low holding voltage of +/−10V.

Figure 9:
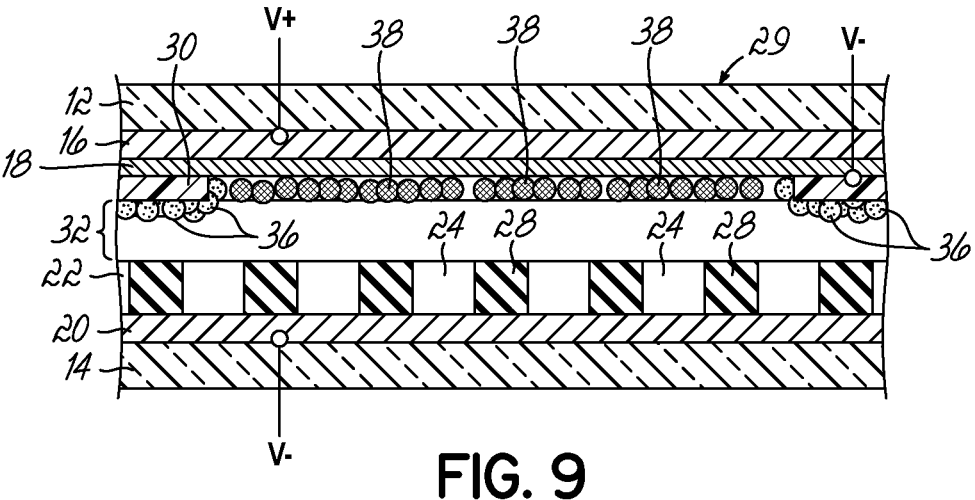
FIG. 9 is a cross-sectional view similar to the embodiment shown in FIG. 3 in the G state.

G state: The G state as shown in FIG. 9 is set from the previous W state by reversing the bottom ITO electrode 20 to −25V while the top electrode 16 is switched to +25 V which moves and spreads green particles 38 to the top. The hexagonal electrode 30 is kept at the same potential of −25V from the previous state which still holds the magenta particles 36 in their place. This state can then be maintained at a low holding voltage of +/−10V after the switching is complete in −10 s.

Actively Returning to the K state: A multi-step process is needed similar that needed for the alternate W state, for optimal optical performance (most complete particle movement). It is best to first leave the G state by returning to the alternate W state. Then the K state can be achieved within. ~7 s by spreading the particles 36 and 38 by repeatedly reversing voltage between the bottom electrode 20 and the electrode 30 (FIG. 1), followed by removing all the voltages. Complete mixing is difficult to quantify and is achieved only after the voltages are removed for 10 s.

Figure 11:
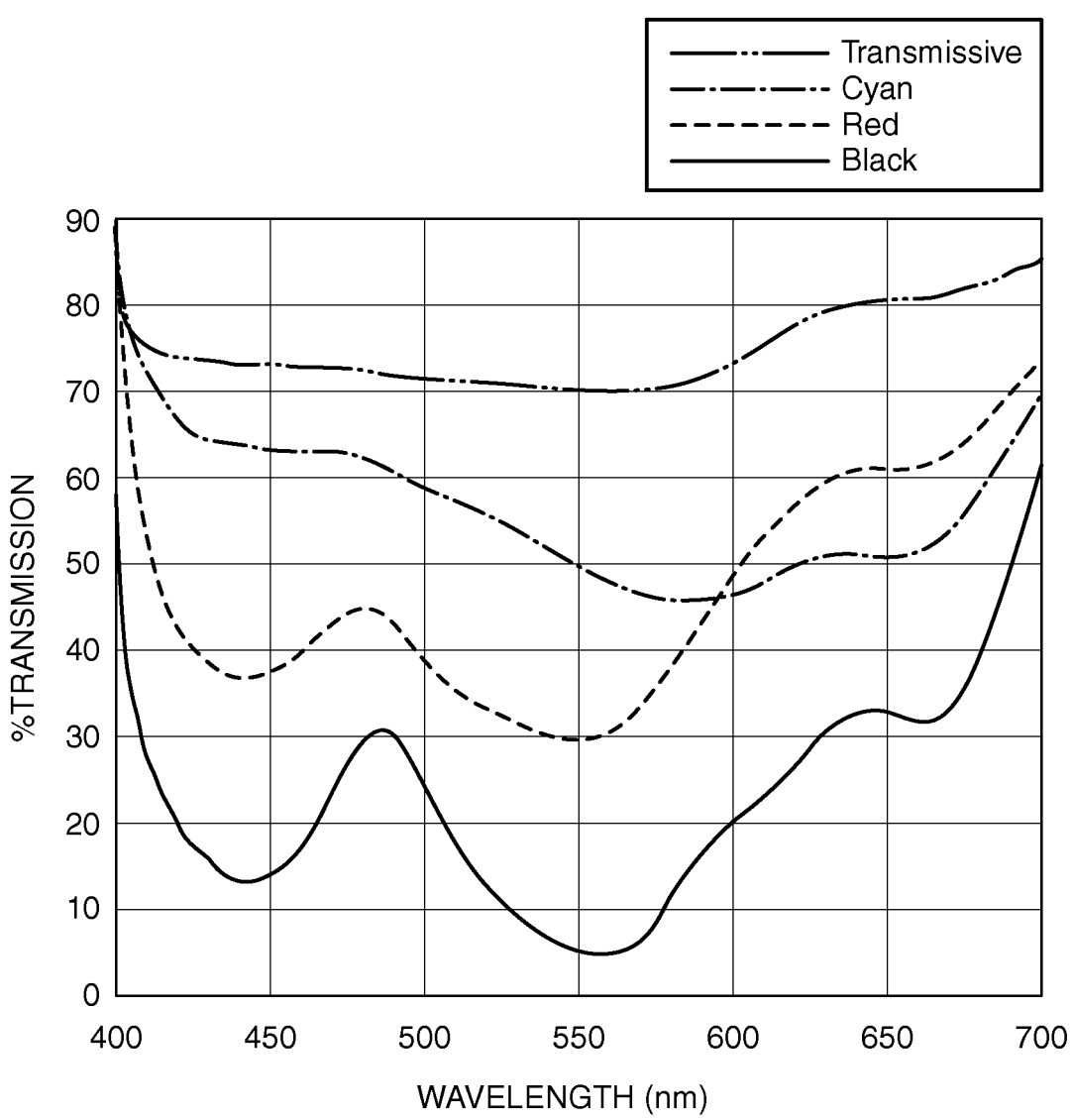
FIG. 11 is a graph showing percent reflection versus wavelength of an embodiment of the present invention in the W, M, G and K states.
Figure 12:
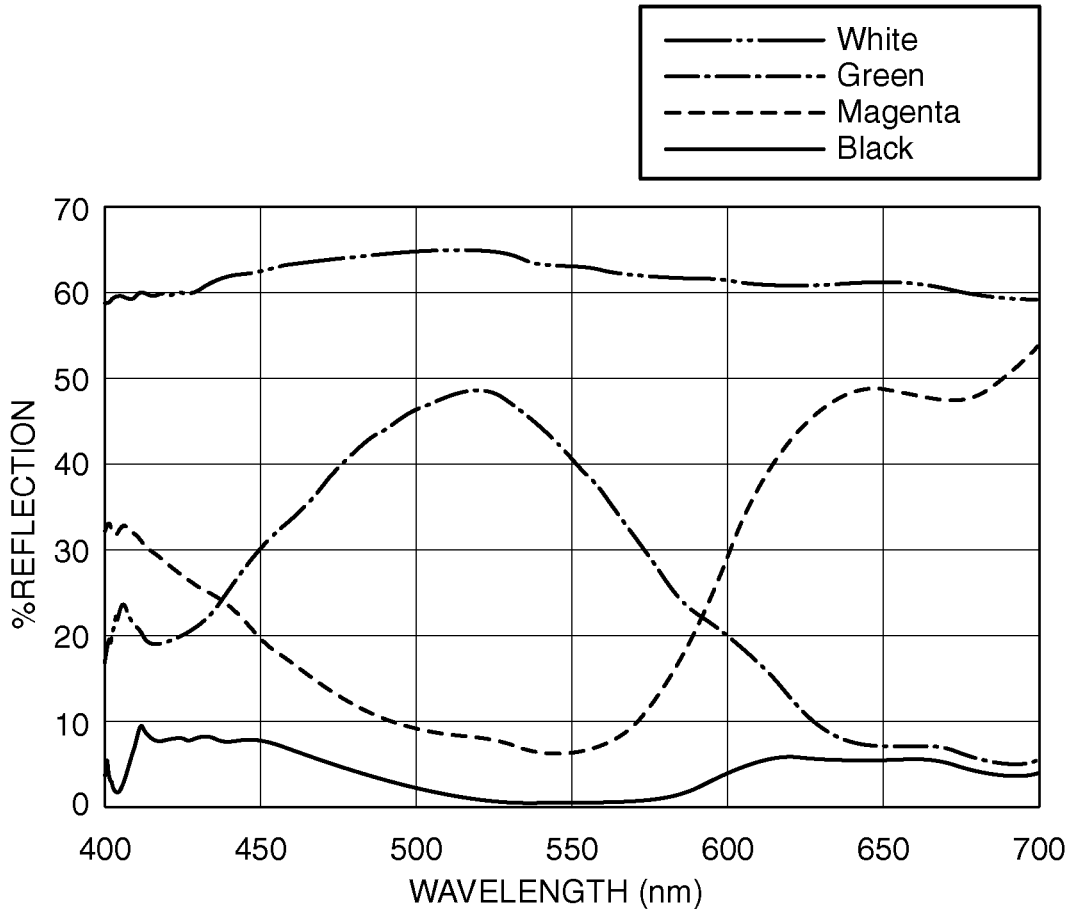
FIG. 12 is a graph of an embodiment of the present invention showing transmission versus wavelength in the T, R, C and K states, showing transmissive cyan, red and black states.

A laminate having a red cyan dispersion was prepared and the transmission spectra was measured, and the results are shown in FIG. 11. In this embodiment, substrates 12 and 14 are clear. The light transmission through the laminate in the transmissive, cyan, red and black states is shown. The reflective spectra of a device formed with a green/magenta particle dispersion is shown in FIG. 12. In this embodiment, substrate 14 is reflective. The light reflected in the white, green, magenta and black states is shown.

Thus, the present invention provides a three electrode electrokinetic device with dual charges, dual color colloidal dispersion ink for smart windows or smart mirrors. This laminate adds the ability to switch pixels into multispectral states, improving color performance in reflective displays and providing color temperature control for smart windows. Further, the structure allows for simple fabrication using low-cost large area fabrication techniques, allowing the laminate to be formed inexpensively and thus expanding its potential applications.

In one embodiment, the hole pattern of foraminous layer 22 can be used to reduce diffraction in a device using a fluid with only particles of the same charge. In this embodiment, the foraminous layer 22 (in either of the embodiment shown in FIG. 2 or 3) has a hole pattern which reduces diffraction. The laminate 10 includes a colloidal dispersion with particles with the same charge. By applying a voltage to electrode 20, the particles (not shown) would fill holes 24 and thus reduce diffraction without altering other optical properties. Further in this embodiment, the third electrode 30 would be unnecessary. As previously indicated, exemplary hole patterns which reduce diffraction are shown in FIGS. 10A-10C. Also, as discussed previously, the geometry of the spacer layer can also be adjusted to prevent diffraction. In particular, a tessellated non-Euclidean pattern can be employed.

Therefore, the devices demonstrated here, along with an improved blue/yellow dispersion, could provide the first ever smart window capable of both dimming light transmission and altering the color temperature of transmitted light. The yellow-state could even be amber/orange tinted, which would improve the opacity of the black state. Further, the laminate can be designed to reduce or eliminate diffraction.

In an alternate embodiment of the present invention, particles dispersed in the fluid can have the same polarity of charge, but different electrophoretic mobilities or zeta potentials. For example, a first particle could have a similar average size as a second particle which is of different color, but the first particle would have twice the amount of electrical charge. Therefore, the first particle would have a lower voltage threshold for movement which may be referred to as a first threshold voltage. The second particle would have a greater threshold voltage for movement referred to as a second threshold voltage. Therefore, if only the first threshold voltage was applied, the first particles would substantially move whereas the second particles would not. If the second threshold voltage were applied, both the first and second particles would move, with the first moving more quickly. As a result, the variations of colors and mixed colors and optical states of the present invention can be achieved without two particles of opposite polarities. Such a configuration could also allow operation of the present invention without the third electrode, by, for example, voltage thresholding of which particles are spread or compacted.

This has been a description of many different embodiments of the present invention. However, the invention itself should be defined by the appended claims wherein we claim:

What is claimed is:

1. A laminate, comprising:
a transparent first layer coated with a planar first electrode;
a second layer coated with a planar second electrode;
a foraminous insulating third layer between the transparent first layer and the second layer;
a third electrode having a grid structure and being between and separated from the planar first electrode and the planar second electrode; and
a cell gap between the foraminous insulating third layer and the planar first electrode, the cell gap including a colloidal dispersion of first particles and second particles, the first particles having a first charge and a first optical property and the second particles having a second charge different from the first charge and a second optical property different from the first optical property.

2. The laminate of claim 1, where the first charge has a positive polarity and the second charge has a negative polarity.

3. The laminate of claim 1, where the first charge is different in magnitude than the second charge, such that the first particles and the second particles have different voltage thresholds for movement.

4. The laminate of claim 1 further comprising an insulating layer adjacent the planar first electrode, and wherein the third electrode is on a side of the insulating layer opposite the planar first electrode.

5. The laminate of claim 1 further comprising an electrically insulating adhesive between the planar first electrode and the third electrode.

6. The laminate of claim 1 wherein the third electrode is a conductive adhesive binding the laminate together.

7. The laminate of claim 1 wherein the planar first electrode is transparent, the second layer is transparent, the planar second electrode is transparent, and the laminate is a smart window.

8. The laminate of claim 1 wherein the first optical property is opaque and the second optical property is transparent to visible light and absorbs infrared light.

9. The laminate of claim 1 wherein the first optical property is opaque and the second optical property is optically scattering to a visible light spectrum.

10. The laminate of claim 1 wherein the first optical property and the second optical property are colors.

11. The laminate of claim 1 wherein the first optical property is a first color and the first particles transmit primarily blue light and wherein the second optical property is a second color and the second particles transmit at least most of red light.

12. The laminate of claim 1 wherein the first optical property and the second optical property are colors that are complementary.

13. The laminate of claim 1 wherein the foraminous insulating third layer defines a pattern of holes that does not have repeating rows and columns of holes.

14. The laminate of claim 13 wherein the pattern of holes has multiple spiral rows of holes.

15. The laminate of claim 13 wherein the pattern of holes forms a Conway pinwheel pattern.

16. The laminate of claim 13 wherein the cell gap between the foraminous insulating third layer and the planar first electrode is supported by a spacer layer.

17. The laminate of claim 1 wherein the laminate is flexible and is adhered to a glass panel.

18. The laminate of claim 1 wherein one of the transparent first layer and the second layer is rigid and the other of the transparent first layer and the second layer is a flexible film.

19. The laminate of claim 1 wherein the foraminous insulating third layer defines a continuous spacer and wherein the third electrode is on a top surface of the continuous spacer, wherein the continuous spacer defines a plurality of closed cells.

* * * * *